Nov. 15, 1938.   N. P. STOATE   2,137,187
APPARATUS FOR DETECTING THE PRESENCE OF FOREIGN
BODIES IN OR ON TRANSPARENT VESSELS
Filed Sept. 14, 1934   2 Sheets-Sheet 1

INVENTOR
Norman P. Stoate
BY
ATTORNEY

Nov. 15, 1938. N. P. STOATE 2,137,187
APPARATUS FOR DETECTING THE PRESENCE OF FOREIGN
BODIES IN OR ON TRANSPARENT VESSELS
Filed Sept. 14, 1934 2 Sheets-Sheet 2
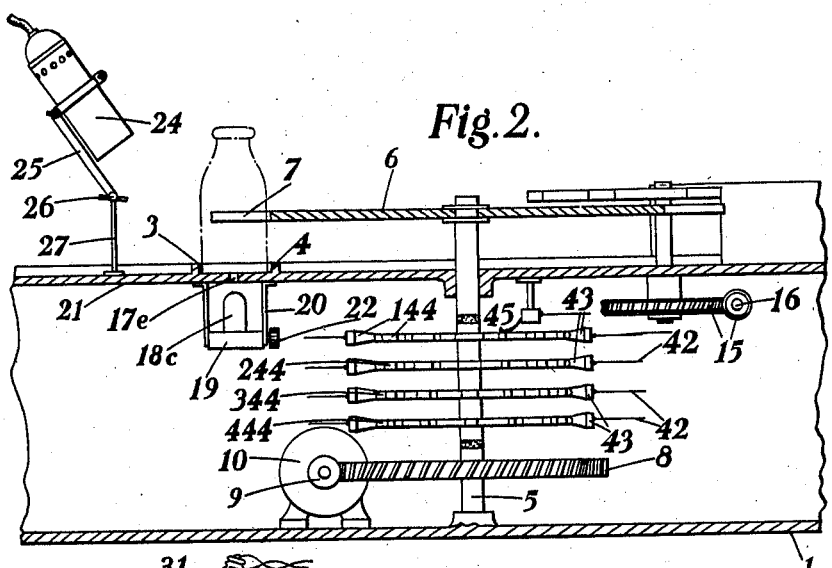
INVENTOR
Norman P. Stoate
BY
ATTORNEY Patented Nov. 15, 1938

2,137,187

UNITED STATES PATENT OFFICE 2,137,187

APPARATUS FOR DETECTING THE PRESENCE OF FOREIGN BODIES IN OR ON TRANSPARENT VESSELS

Norman Parker Stoate, London, England

Application September 14, 1934, Serial No. 744,089
In Great Britain September 25, 1933

5 Claims. (Cl. 88—14)

This invention relates to apparatus for detecting the presence of foreign bodies on the bottom of a transparent vessel.

In the case of vessels, for example, of glass, which are used to contain foodstuffs, and when empty are washed by machinery and refilled, it is highly important that no particles of foreign matter should remain on the bottom of the vessel.

The object of the present invention is to provide means for automatically detecting the presence of such minute particles, thereby obviating the necessity of employing an inspector to examine such vessel by eye.

According to the present invention apparatus for detecting the presence of foreign bodies on the bottom of a transparent vessel comprises in combination means for producing a beam of light, a track having a plurality of apertures therein, said apertures being so spaced laterally along the width of the track that upon movement of the vessel from the first to the last aperture the whole surface to be examined will have been scanned, means for directing the beam of light through the bottom of the vessel on to the apertures, a light sensitive device disposed beneath each aperture, means for moving the vessel along the track, and means operable by the light-sensitive device to give a signal or indication when the light falling on the light-sensitive device is reduced below a predetermined value.

The light may be in the form of a narrow parallel beam and the aperture should be relatively small compared with the dimensions of the photo-electric cell so that any deviation of the beam will cause a comparatively large reduction in the light reaching the cell.

The photo-electric cell is arranged to control an electric circuit in such a way that if the intensity of the light falling on the cell is reduced below a predetermined value, the change in the current flowing in the circuit operates, for example, through relays, a device to give an indication of the presence of the foreign body.

The cell is disposed so that the normal amount of light falling on it is just sufficient to prevent the cell from operating.

In order to prevent the device from operating in the case in which there is a bubble or other inequality in the material being examined, the intensity of the illumination at the surface being examined, less the light losses due to the bubble and the aperture should be always greater than the least intensity of illumination required to maintain the photo-electric cell out of operation. If this is done the device will not operate in the case of a bubble but will operate in the case of a foregin body, provided that the light loss due to the foreign body is greater than the light loss due to the bubble.

One form of apparatus according to the invention will now be described with reference to the accompanying drawings, in which an apparatus for the examination of milk bottles is diagrammatically illustrated by way of example.

In the drawings:—

Fig. 2 shows the apparatus in sectional elevation,

Fig. 3 is a diagram of the circuit employed, showing two photo-cells only, and

Fig. 4 is a diagram showing the areas scanned by the different cells.

In the drawings like reference numerals designate the same or similar parts.

Figure 1:
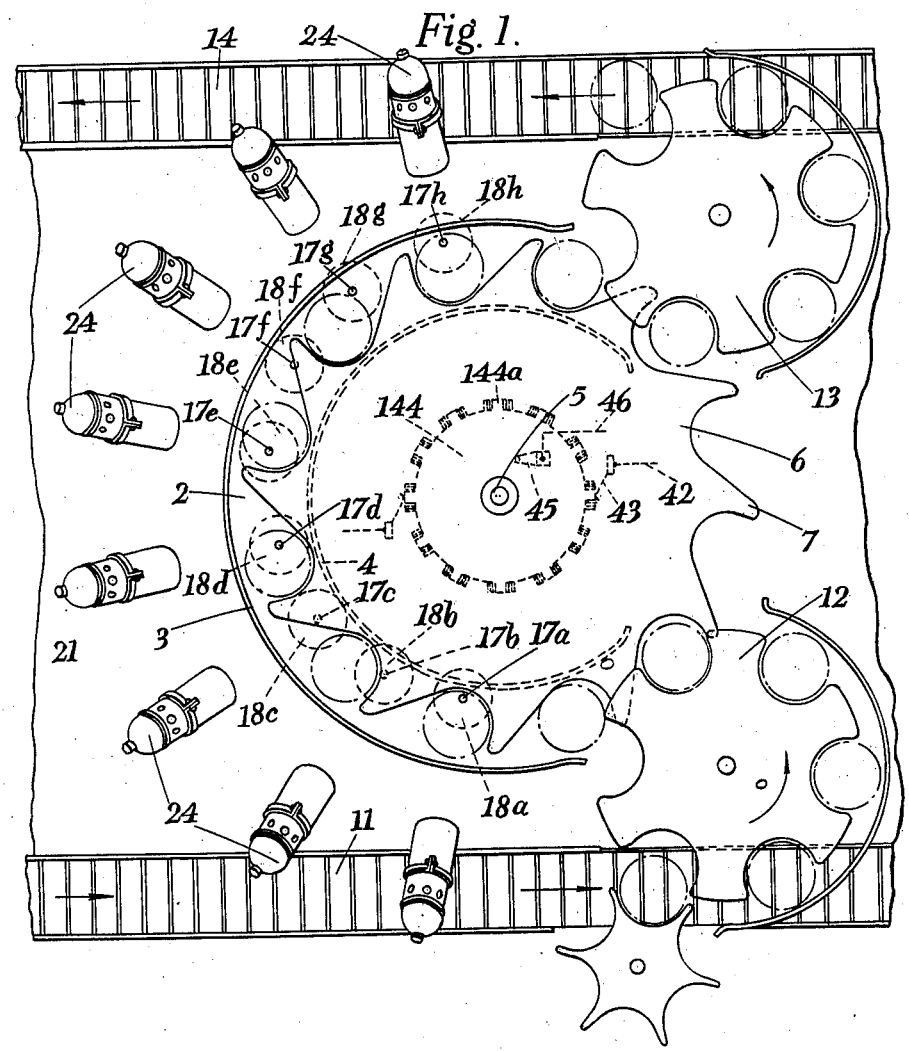
Fig. 1 illustrates the apparatus in plan.

In the construction illustrated in the drawings, the apparatus comprises a casing 1, on which is mounted a circular track 2 for the bottles having lateral guide rails 3 and 4.

Mounted above the track 2 and secured to a driving shaft 5 is a feed plate 6 for the bottles including fingers 7 which, as the plate 6 is revolved, push the bottles along the track, the shaft 5 being driven through gearing 8, 9 from a motor 10.

Mechanism is also provided for feeding bottles to the feed plate 6 at one end of the track 2 and for discharging them at the other end of the track. This mechanism, however, forms no part of the invention and may be of any known kind. For example, as shown in Fig. 1 of the drawings, a conveyor 11 may take the bottles to a dial plate 12 which feeds them to the plate 6, and a second dial plate 13 may be provided on the other side taking bottles from the plate 6 to a discharge conveyor 14.

The dial plates 12 and 13 may be driven through gearing, such as 15 from a shaft 16 (Fig. 2) and are rotated in synchronism with the feed plate 6.

Formed in the track 2 is a series of eight circular apertures 17a, 17b, 17c—17h, each of a diameter equal to one-eighth of the inside diameter of the bottle to be examined.

The spacing of these eight apertures is as follows:—

The first aperture 17a is placed with its centre on a circle concentric with the inner guide rail 4 but having a radius greater than the outside radius of the rail 4 by an amount equal to the thickness of the bottle wall plus one-sixteenth of the inside diameter of the bottle.

The second aperture 17b has its centre on a circle of a radius which is greater than that of the first mentioned circle by an amount equal to one-eighth of the inside diameter of the bottle. Similarly the remaining apertures are placed with their centres on circles, each of which has a radius greater than that of the adjacent circle by an amount equal to one-eighth of the inside diameter of the bottle.

Finally the inside radius of the outer guide rail 3 is greater than the outside radius of the inner guide rail 4 by an amount equal to the outside diameter of the bottle.

It will thus be seen that if all the apertures 17a, 17b—17h were placed on the same radius, their edges would coincide and they would extend completely across the inside diameter of the bottle.

By placing the apertures as just described, spaced out along the track 2, the whole of the bottom of the bottle is scanned, but in sections, the bottle passing over one aperture at a time.

Beneath each aperture 17a, 17b—17h is disposed a photo-electric cell 18a, 18b—18h (Fig. 1). The cell is mounted on a base 19 (Fig. 2) which can be pushed up into a holder 20 secured to the underside of the top 21 of the casing 1. The cell is located in position by means of a set screw 22 sliding in a slot in the holder 20, the length of the slot determining the position of the cell relative to the aperture.

Associated with each aperture 17a, 17b—17h is a source of light including a lamp (shown diagrammatically at 29 in Fig. 3) carried in a holder 24 secured to an arm 25 pivoted by a thumb screw 26 to a standard 27 attached to the top 21 of the casing 1 (Fig. 2). By means of the thumb screw 26 the position of the lamp relative to the aperture can be adjusted.

In each aperture 17a, 17b—17h is provided a lens 28 (Fig. 3) for the purpose of directing a parallel beam on to the anode 30 of the photo-cell. Each lamp holder is also provided with a condenser lens 31 (Fig. 3).

Each of the eight photo-cells is connected through suitable amplifying means to an electro-magnetically operated switch serving to close the circuit of a device for giving an indication and/or stopping the bottle feed when a bottle containing a foreign body is detected by one of the cells.

Such indicating means and the circuit for controlling it may be of any form, but one arrangement is shown in Fig. 3 of the accompanying drawings, the circuit for one cell only being shown for the sake of clarity.

In this arrangement the anode 30 of the photo cell 18e is connected through a conductor 32 to the negative side of the source of supply, and the cathode 33 is connected through a conductor 34 to the grids of an amplifying valve 36. The anode of the valve 36 is connected through a resistance 38 to the coil 39 of a relay of which the armature 40 controls a pair of contacts 41. The other end of the relay coil 39 is connected through a conductor 42 to a contact brush 43 co-operating with a cam disc 144 secured to the shaft 5 but insulated therefrom. The connection to the positive side of the source of supply is completed by means of a contact brush 45, bearing on the disc 144, and a conductor 46.

The filaments of the valves 36 are fed from a convenient source of current and are also connected to the negative side of the source of supply.

Also secured to the shaft 5 are three other cam discs 244, 344 and 444, all four discs being electrically connected, but insulated from the shaft 5. With each disc co-operates a contact brush similar to the brush 43 shown in the case of the uppermost disc 144 in Fig. 3.

The purpose of these cam discs is to control the current supply to the photo-cells 18a, 18b—18h so as to switch the current on just after the leading edge of the bottom of a bottle has reached the associated aperture 17a, 17b—17h and to switch the current off just before the trailing edge leaves the aperture.

It will facilitate understanding of the operation of the apparatus if mention be here made of the fact that in the case of a bottle or like vessel it is necessary for the current to be switched off while the walls of the bottle are passing over the apertures. If this were not done the relative opacity of these walls would cause the photo-cell to operate and stop the motor 10 just as if a foreign body were present.

Referring to Fig. 1, it will be seen that owing to the disposition of the apertures 17a, 17b—17h and the fact that there is an even number of apertures, the paths traced by the two outside apertures 17a and 17h as a bottle passes over them are substantially equal in length. Similarly the paths traced by the next pair of apertures 17b and 17g are equal but longer, while the paths traced by the apertures 17c and 17f are also equal but longer still and the paths traced by the two inner apertures 17d and 17e are also equal and longer than any of the others.

The lengths of these paths are shown diagrammatically in Fig. 4, the paths of the apertures 17a and 17h being indicated at 47a and 47h, while those of the apertures 17b, 17g; 17c, 17f; and 17d, 17e are indicated at 47b, 47g; 47c, 47f and 47d, 47e respectively.

Since the time during which the current is switched on to each photo-cell depends on the length of the path traced by the associated aperture, the cells can be connected in pairs and a common current control device can be employed to control the current supply to each pair.

The discs 144, 244, 344 and 444 respectively control the current supply to the pairs of photo-cells, 18d, 18e; 18c, 18f; 18b, 18g and 18a, 18h in the following manner:

Each disc has formed on it a number of cam projections, there being one such projection for each of the fingers on the disc 6. Referring to Fig. 1, it will be seen that the feed plate 6 is provided with twelve fingers. Accordingly each disc has twelve cam projections.

Considering now the uppermost disc 144 this has twelve cam projections indicated at 144a, which co-operate with the contact brushes 43 to close the circuits of the valves 36 associated with the photo cells 18d and 18e which are connected in parallel.

The arrangement is shown in Fig. 3 in which, however, only the circuit of cell 18e is shown in full, the circuit of the other cell 18d with its associated valve 36 and relay 39 being the same. Accordingly only the brush 43 for the circuit of the cell 18d is shown to the left of the disc 144.

The length of the cams 144a is such as to close the circuit just after the leading inside edge of a bottle reaches the apertures 17d and 17e and to open the circuit just before the trailing inside edge leaves these apertures. The length of the cams 144a is therefore proportional to the length of the paths 47d, 47e in Fig. 4.

The control of the current supply to the valves of the other pairs of cells is similarly effected by cams 244a, 344a and 444a on the discs 244, 344

444, the lengths of these cams being, as can be seen from Fig. 3, proportional to the lengths of the paths 46c, 47f; 47b, 47g and 47a, 47h in Fig. 4 respectively. Each disc co-operates with two contact brushes 43 thereby controlling the current supply to two halves 36.

From the foregoing description it will be seen that as the shaft 5 rotates and the bottles are carried round the track by the feed plate 6, the current to the photo-cells is switched on and off as each bottle passes an aperture, by means of the cam discs 144—444.

It will be appreciated that if there is an odd number of photo-cells, it will not be possible to control the current supply to their valves in pairs, in which case a cam disc such as 144 is provided for each cell.

The strength of the current passing through the relays 39, however, is such that, provided that there is no foreign body in any of the bottles, the relays 39 are not energized sufficiently to attract their armatures 40, whereby the associated contacts 41 remain open.

If now one of the bottles contains a foreign body, then as the bottle travels along the track, the foreign body will pass over one or other of the apertures and diminish the light falling on the associated photo-cell. If the foreign body is a piece of glass, the light will be diminished by refraction causing deviation of the light beam away from the aperture. On the other hand, an opaque body will merely prevent the passage of the light.

In either case the photo-cell will effect a variation in the grid current of the valve 36, whereby the current through the relay 39 is increased and the armature 40 is attracted, closing the contacts 41.

Closure of contacts 41 energizes a magnet 48 (from battery 49) whereby the armature 50 is attracted and separates contacts 51 located in the circuit of the motor 10 driving the bottle feeding plate 6. Consequently the bottles stop and the defective bottle can be removed.

It may happen that before the motor has stopped the defective bottle may have moved beyond the range of the photo-cell detected the foreign body, whereupon the contacts 41 would open again and the motor continue to run.

In order to obviate such an occurrence it is preferred to provide a holding circuit for the magnet 48, by means of a contact 52 carried on a pivoted arm 53. This arm 53 is normally held by the armature 50 so that its contact 52 is clear of a contact 54, but when the armature 50 is attracted the arm 53 moves under the action of a spring (not shown) to close contacts 52 and 54, thereby establishing a holding circuit for the magnet 48.

The armature 51 is influenced by a spring (not shown) tending to return it to the released position and by pushing down the arm 53 the armature 51 is permitted to spring back over the arm 53 and hold it in its normal position as shown in Fig. 3.

In Fig. 3 only one magnet 48 and associated contacts 51 are shown. There is, however, a magnet 48 and contacts 51 for each pair of contacts 41, there being a pair of contacts 41 for each cell 18a—18h.

The contacts 51 are all connected in series in the circuit of the motor 10 so that if any contact 51 opens the motor stops.

The invention is not limited to the detection of foreign bodies but may also be applied to the detection of faults or bubbles in vessels or sheets of transparent material. In either case the relation between the intensity of illumination at the surface to be examined and the intensity of illumination required to prevent the light-sensitive device from operation must be adjusted in accordance with the type of fault or foreign body to be detected, i. e. in accordance with the loss of light caused thereby.

Although the invention has been described as employing light for the purpose of detecting foreign bodies, it is not restricted to the use of white light since any form of light may be employed from the extreme red rays to the near violet rays.

What I claim is:—

1. Apparatus for detecting the presence of foreign bodies on the bottom of a transparent vessel comprising in combination means for producing a beam of light, a track having a plurality of apertures therein, said apertures being so spaced laterally along the width of the track that upon movement of the vessel from the first to the last aperture the whole surface to be examined will have been scanned, means for directing the beam of light through the bottom of the vessel on to the apertures, a light-sensitive device disposed beneath each aperture, means for moving the vessel along the track, and means operable by the light-sensitive device to give a signal or indication when the light falling on the light-sensitive device is reduced below a predetermined value.

2. Apparatus for detecting the presence of foreign bodies on the bottom of a transparent vessel comprising in combination means for producing a beam of light, a track having a plurality of apertures therein, said apertures being so spaced laterally along the width of the track that upon movement of the vessel from the first to the last aperture the whole surface to be examined will have been scanned, means for directing the beam of light through the bottom of the vessel on to the apertures, a photo-electric cell disposed beneath each aperture, means for moving the vessel along the track, means operable by the photo-electric cell to give a signal or indication when the light falling on the photo-electric cell is reduced below a predetermined value, and means operative as the vessel passes along the track to switch on the current in the circuit to be controlled by each photo-electric cell immediately after the leading edge of the surface to be examined has reached the cell and to switch off said current immediately before the trailing edge reaches the cell whereby operation of the cell by the refraction caused by the side walls of the vessel is avoided.

3. Apparatus for detecting the presence of foreign bodies on the bottom of a transparent vessel comprising in combination a track having a plurality of apertures therein, said apertures being so spaced laterally along the width of the track that upon movement of the vessel from the first to the last aperture the whole surface to be examined will have been scanned, and the apertures being spaced apart along the track so that the vessel reaches them one after the other, means for moving the vessel along the track, means for producing a beam of light, means for directing said beam through the bottom of the vessel on to the apertures, a photo-electric cell disposed beneath each aperture and means operable by the photo-electric cell to give a signal or indication when the light falling on the photo-electric cell is reduced below a predetermined value.

4. Apparatus for detecting the presence of foreign bodies on the bottom of a transparent vessel comprising in combination a track having a plurality of apertures therein, said apertures being so spaced laterally along the width of the track that upon movement of the vessel from the first to the last aperture the whole surface to be examined will have been scanned, and the apertures being spaced apart along the track so that the vessel reaches them one after the other, means for moving the vessel along the track, means for producing a beam of light, means for directing said beam through the bottom of the vessel on to the apertures, a photo-electric cell disposed beneath each aperture, means operable by each photo-electric cell to give a signal or indication when the light falling on any photo-electric cell is reduced below a predetermined value, and means operative as the vessel passes along the track, to switch on the current in the circuit to be controlled by each photo-electric cell immediately after the leading edge of the surface to be examined has reached the cell and to switch off said current immediately before the trailing edge reaches the cell, whereby operation of the cell by the refraction caused by the side walls of the vessel is avoided.

5. Apparatus according to claim 4 for examing milk bottles or like vessels of circular cross section, wherein an even number of photo-cells and associated apertures is employed and those cells whose associated apertures are disposed in similar positions but on opposite sides of the centre of the track are connected to a source of current through common wires, a cam-controlled contact being disposed in each common wire to control the supply of current to the connected cells, while the operative portion of the contour of each cam is of a length depending on the length of the portion of the bottle scanned by the associated cells.

NORMAN PARKER STOATE.